US009198002B2

(12) United States Patent
Derks et al.

(10) Patent No.: US 9,198,002 B2
(45) Date of Patent: Nov. 24, 2015

(54) PEER-TO-PEER DEVICE MOVEMENT COMMUNICATIONS

(71) Applicant: Microsoft Corporation, Redmond, WA (US)

(72) Inventors: Patrick Joseph Derks, Seattle, WA (US); Darin James Dishneau, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 13/831,895

(22) Filed: Mar. 15, 2013

(65) Prior Publication Data

US 2014/0274142 A1   Sep. 18, 2014

(51) Int. Cl.
*H04W 24/00* (2009.01)
*H04W 4/02* (2009.01)
*H04L 12/58* (2006.01)

(52) U.S. Cl.
CPC ............. *H04W 4/027* (2013.01); *H04L 51/20* (2013.01); *H04W 4/021* (2013.01); *H04W 4/023* (2013.01)

(58) Field of Classification Search
CPC ....... H04W 4/02; H04W 64/00; H04W 80/04; H04L 29/06; H04L 43/50; G06F 9/4843; H04M 3/42348
USPC ................ 455/456.3, 456.2, 456.1, 457, 466, 455/404.1; 370/241, 328; 709/221; 718/100; 379/207.12
See application file for complete search history.

(56) References Cited

U.S. PATENT DOCUMENTS

| 8,135,377 | B2 | 3/2012 | Baghdasaryan |
| 8,340,658 | B2 | 12/2012 | Tsui et al. |
| 2006/0030339 | A1 | 2/2006 | Zhovnirovsky et al. |
| 2008/0032666 | A1* | 2/2008 | Hughes et al. ............. 455/404.1 |

(Continued)

FOREIGN PATENT DOCUMENTS

| EP | 2053881 A1 | 4/2009 |
| EP | 2466539 A1 | 6/2012 |

OTHER PUBLICATIONS

"International Search Report & Written Opinion for PCT Patent Application No. PCT/US2014/022221", Mailed Date: Jun. 3, 2014, Filed Date: Mar. 10, 2014, 10 Pages.

(Continued)

*Primary Examiner* — Charles Appiah
*Assistant Examiner* — Alexander Yi
(74) *Attorney, Agent, or Firm* — Bryan Webster; Judy Yee; Micky Minhas

(57) ABSTRACT

Embodiments of the disclosure provide peer-to-peer communication of device movements. A first computing device receives a message from a second computing device via a peer-to-peer connection. If the message does not include movement information, the first computing device requests from the second computing device the movement information describing travel of the second computing device. Upon receipt of the movement information over the peer-to-peer connection, the first computing device presents the received message and the received movement information to a user of the first computing device. The movement information may include route, velocity, heading and an estimated time of arrival, and may be periodically updated via additional messages sent to the first computing device. In some embodiments, the first computing device and the second computing device are configured to automatically send and receive movement information without user input.

20 Claims, 6 Drawing Sheets

(56) References Cited

U.S. PATENT DOCUMENTS

| | | | |
|---|---|---|---|
| 2008/0032703 A1* | 2/2008 | Krumm et al. | 455/456.1 |
| 2008/0070593 A1* | 3/2008 | Altman et al. | 455/457 |
| 2008/0232571 A1* | 9/2008 | Millard et al. | 379/207.12 |
| 2009/0006566 A1 | 1/2009 | Veeramachaneni et al. | |
| 2009/0197617 A1 | 8/2009 | Jayanthi | |
| 2009/0325603 A1* | 12/2009 | Van Os et al. | 455/456.2 |
| 2010/0317368 A1 | 12/2010 | Augst et al. | |
| 2013/0045759 A1* | 2/2013 | Smith | 455/456.6 |

OTHER PUBLICATIONS

Jadalhack, MAC., "Free App: Add Current Location to Text Messages with Wizi SMS Location", Retrieved at <<http://www.pocketberry.com/2010/05/07/free-app-add-current-location-to-text-messages-with-wizi-sms-location/>>, May 7, 2010, pp. 7.

"iPhone Tracks Users' Movements", Retrieved at <<http://www.bbc.co.uk/news/technology-13145562>>, Retrieved Date: Jan. 14, 2013, pp. 2.

"How to Get SMS Notifications for Tweets and Interactions", Retrieved at<<https://support.twitter.com/articles/20169920-how-to-get-sms-notifications-for-tweets-and-interactions>>, Retrieved Date: Jan. 14, 2013, pp. 4.

Caldwell, Serenity., "Hands on with iOS 6: Maps", Retrieved at <<http://www.macworld.com/article/2010067/hands-on-with-ios-6-maps.html>>, Sep. 19, 2012, pp. 5.

"At&T FamilyMap: How It Works", Retrieved at <<http://familymap.wireless.att.com/finder-att-family/howWorks.htm>>, 2012, pp. 2.

* cited by examiner

PEER-TO-PEER DEVICE MOVEMENT COMMUNICATIONS

BACKGROUND

Users often like to know the current location of their friends and/or family members. Using existing mobile telephone systems, users manually request location request, such as in the form of a text message. For example, the user may send one text message to a friend asking "Where are you?" and the friend may respond with another text message answering "at grocery store."

Further, many existing mobile telephones are equipped with a global positioning system (GPS) to enable identification of a current device location. Some of these existing mobile telephones also enable the user to attach a map showing the current device location in a text message. However, such existing mobile telephones require manual involvement by the user and the recipient, and the current device location is static information. That is, such existing mobile telephones lack a mechanism for updating the current device location when the current device location changes.

SUMMARY

In some embodiments, a first computing device receives a message from a first user intended for a second user at a second computing device. In response to receipt of the message, the first computing device derives the movement information (e.g., from sensors of the first computing device). The first computing device sends the received message and the derived movement information to the second computing device via a peer-to-peer connection. Subsequently, the first computing device derives updated movement information for the first computing device from the sensors and compares the derived, updated movement information with the sent movement information. The updated movement information is sent to the second computing device based on the comparison.

In other embodiments, a first computing device receives a message from a second computing device via a peer-to-peer connection. In response to receipt of the message, the first computing device requests from the second computing device movement information relating to the second computing device that describes travel of the second computing device. After the first computing device has received the requested movement information from the second computing device, the first computing device presents the received message and the received movement information to a user of the first computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Referring to the figures, embodiments of the disclosure enable the sending and/or receipt of movement information between devices via a peer-to-peer connection. For example, a first user 104 of a first computing device 102 pushes, or otherwise provides, movement information describing travel of the first computing device 102 to a second user 122 of a second computing device 124. As another example, the first computing device 102 pulls, or otherwise requests, the movement information from the second computing device 124, such as upon receipt by the first computing device 102 of a message (e.g., a text message) from the second computing device 124. Exemplary movement information includes, but is not limited to, a current route, velocity, direction of movement, a current estimated time of arrival, and/or other data describing device travel (e.g., expected and/or anticipated).

Aspects of the disclosure enable two or more users such as family members, close friends, and business associates to exchange the movement information. The movement information may be exchanged manually and/or automatically (e.g., without explicit action from one or both users), as described further herein. Additionally, the movement information may be updated regularly, periodically, intermittently, based on events, based on criteria, rules, etc.

By using a peer-to-peer connection rather than a central service, some embodiments provide users with increased privacy, security, and control over the data being shared between devices. For example, with the peer-to-peer connection, the shared data is not stored on a central server where the data could be mined or accessed by other parties. For shared data that is sensitive (e.g., movement information), users may feel more secure sharing such data over a peer-to-peer connection.

Additionally, the cost of using a peer-to-peer connection to share the movement information may be lower than using a central service to share this information. In fact, in some geographic areas, the cost for sharing the movement information over a peer-to-peer connection may be covered under existing text messaging plans.

Figure 1:
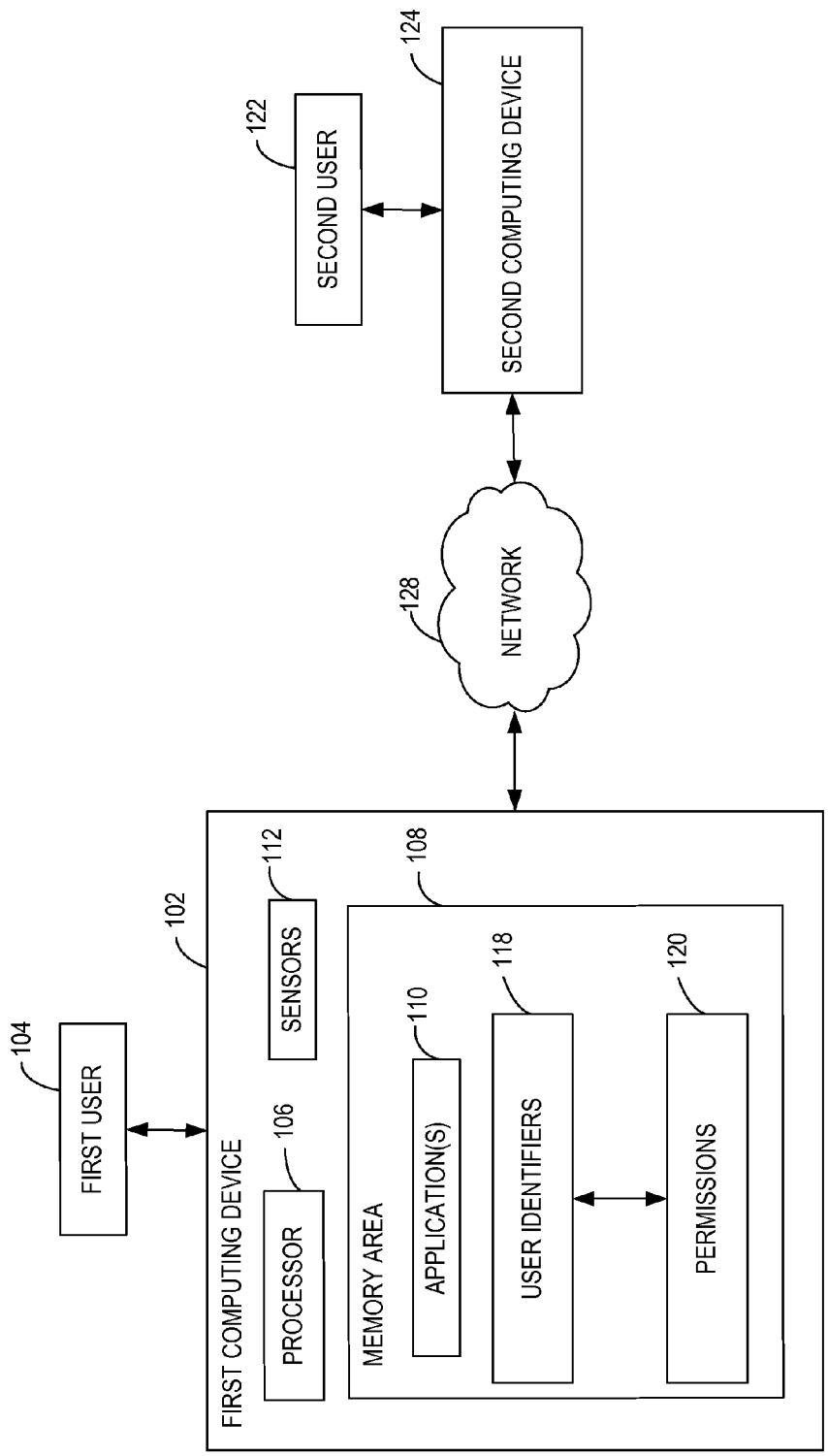
FIG. 1 is an exemplary block diagram illustrating a first computing device associated with a first user in communication, via a network, with a second computing device associated with a second user.

Referring to FIG. 1, an exemplary block diagram illustrates the first computing device 102 associated with the first user 104 in communication with the second computing device 124 associated with the second user 122 via a network 128. The computing devices 102 and 124 may perform communication using a variety of protocols and transports, such as to support voice communication, text messaging (e.g., Short Messaging Service, Multimedia Messaging Service), instant messaging, communication via a social network service, electronic mail, and the like. Accordingly, the computing devices 102 and 124 may utilize a variety of different techniques to communicate with each other.

The computing devices 102 and 124 communicate via one or more of the networks 128, which may be implemented to include a wired and/or a wireless network. The network may also be implemented using any type of network topology and/or communication protocol, and may be represented or otherwise implemented as a combination of two or more networks, to include Internet Protocol (IP) networks and/or the Internet. The network 128 may also include mobile operator networks that are managed by a mobile network operator and/or other network operators, such as a communication service provider, mobile phone provider, and/or Internet service provider.

The example of FIG. 1 illustrates a system for communication of the movement information. While aspects of the disclosure are described with reference to communication between the computing devices 102 and 124 via a peer-to-peer connection, non-peer-to-peer connections are within the scope of the disclosure.

Each of the computing devices 102 and 124 represents any device executing instructions (e.g., as application programs, operating system functionality, or both) to implement the operations and functionality described and illustrated herein. The computing devices 102 and 124 may include mobile computing devices or any other portable devices. In some embodiments, the mobile computing devices includes a mobile telephone, laptop, tablet, computing pad, netbook, gaming device, and/or portable media player. The computing devices 102 and 124 may also include less portable devices such as desktop personal computers, kiosks, tabletop devices, industrial control devices, wireless charging stations, and electric automobile charging stations at least for the purpose of receiving messages and the movement information. Additionally, the computing devices 102 and 124 may represent a group of processing units or other computing devices. One of the computing devices 102 and 124 may represent one form or type of device, while the other one of the computing devices 102 and 124 represent another form or type of device.

In some embodiments, each of the computing devices 102 and 124 include the elements illustrated in FIG. 1. For clarity, the elements are illustrated and next described with reference to being associated with the first computing device 102.

As shown in FIG. 1, the first computing device 102 has one or more sensors 112, at least one processor 106, a memory area 108, and at least one user interface. The sensors 112 include one or more accelerometers, one or more gyroscopes, a global positioning system (GPS) transceiver, a wireless fidelity (Wi-Fi) or other wireless transceiver, a photoreceptive light sensor, and other sensors providing data describing the first computing device 102.

The processor 106 includes any quantity of processing units, and is programmed to execute computer-executable instructions (e.g., stored in the memory area 108) for implementing aspects of the disclosure. The instructions may be performed by the processor 106 or by multiple processors executing within the first computing device 102, or performed by a processor external to the first computing device 102. In some embodiments, the processor 106 is programmed to execute instructions such as those illustrated in the flow charts to implement the functionality described herein.

In some embodiments, the processor 106 represents an implementation of analog techniques to perform the operations described herein. For example, the operations may be performed by an analog computing device and/or a digital computing device.

The first computing device 102 further has one or more computer storage media such as the memory area 108. The memory area 108 includes any quantity of media associated with or accessible by the first computing device 102. The memory area 108 may be internal to the first computing device 102, external to the first computing device 102, or both. In some embodiments, the memory area 108 includes read-only memory and/or memory wired into an analog computing device. Further, the memory area 108 may be a part of hardware memory that may comprise volatile and/or non-volatile memories excluding signals.

The computing device 102 stores, in the memory area 108, applications 110, user identifiers 118, and permissions 120, among other data. The applications 110, when executed by the processor 106, operate to perform functionality on the first computing device 102. Exemplary applications 110 include mail application programs, web browsers, calendar application programs, address book application programs, messaging programs, media applications, gaming applications, map applications, location-based services, search programs, and the like. The applications 110 may communicate with counterpart applications or services such as web services accessible via a network. For example, the applications may represent downloaded client-side applications that correspond to server-side services executing in a cloud.

The user identifiers 118 store identifications of other users, such as the second user 122, who are associated with or known by, the first user 104. For example, the user identifiers 118 store identification of the others users associated with the first user 104 based on a contact list, an address book, calendar entries and/or recipients of previous messages sent by the first user 104. Further, the user identifiers 118 may contain identification, contact details, and preferred means of communication with various contact groups such as friends, relatives and colleagues.

The user identifiers 118 have the permissions 120 associated therewith. The permissions 120 may vary from one contact group to another, may vary within each contact group, and/or may be set individually for the users associated with the first user 104. For example, one set of permissions may be associated with the spouse of a user such that movement information of the first user 104 is shared with the spouse irrespective of the day of the week and time of the day, while the movement information of the first user 104 may be shared with a colleague only on specific days and times (e.g., during work hours).

In some embodiments, the permissions 120 may be based on geofencing (e.g., the permissions may be dependent on a location of the first user). For example, movement information to some specific users associated with the first user 104 may be provided only when the first user 104 is within a pre-defined distance from a work location (e.g., office), or only when the first user 104 is beyond the pre-defined distance. In some embodiments, the pre-defined distance or perimeter of the geofence may be dynamically defined by the first user 104, while in other embodiments the pre-defined distance or perimeter may be automatically defined based on the current location of the first user 104.

The user identifiers 118 may be populated by the first user 104, who may vary the permissions 120 associated with the user identifiers 118 (e.g., with time). In others embodiments, the entries for the user identifiers 118 may be automatically populated based on a contact list, an address book, calendar entries, and/or recipients of previous messages. Further, the permissions 120 may be automatically set (e.g., based on default values or preferences of the first user 104 for obtaining or sharing the movement information). In other embodiments, while the entries for the user identifiers 118 are automatically populated, the permissions 120 associated with each of the user identifiers 118 (or groups of the user identifiers 118) may be specifically set by the first user 104.

In operation, the permissions 120 enable or disable sharing of the movement information. For example, in response to receipt of a message from the second computing device 124, the permissions 120 on the first computing device 102 operate to either block the first computing device 102 from requesting the movement information from the second computing device 124, or to allow the first computing device 102 to request the movement information from the second computing device 124. Similarly, upon receipt by the second computing device 124 of a request from the first computing device 102 for the movement information, the permissions 120 on the second computing device 124 operate to either block or allow the first computing device 102 to receive the movement information from the second computing device 124.

The permissions 120 may also allow or prevent sharing of particular portions of the movement information. For example, the movement information may be filtered based a type of information allowed to be shared as defined by the permissions 120. Further, the level of granularity of the movement information to be shared with particular users may be set via the permissions 120.

The permissions 120 may be defined dynamically based on an evaluation of a received message. For example, a received message is evaluated to classify or categorize the message, and the permissions 120 are defined or determined based on the classification or category. Metadata, such as in the headers of the message, may be evaluated to identify the sender of the message. For example, if the message is sent by a service provider of the network 128, no movement information may be requested or provided. Alternatively or in addition, context information such as the location of the sending device and/or receiving device, remaining battery life of the sending device and/or receiving device, and/or time of day is determined and evaluated to dynamically define one or more of the permissions 120.

In some embodiments, the permissions 120 may be encapsulated in a security policy associated with the first computing device 102 that can be set only by a user who logs in as an administrator. In some embodiments, the user identifiers 118 and/or the permissions 120 may be set by the user logging in as the administrator, and may not be amenable to change by other users of the first computing device 102. As an example, upon request by the second user 122 identified in the user identifiers 118 stored in the first computing device 102, the location of the first computing device 102 may automatically be sent to the second computing device 124 without prompting the first user 104. For example, a parent may set the user identifiers 118 and/or the permissions 120 of a child's mobile telephone and remotely query the child's mobile phones to obtain the current location of the child's mobile telephone without the children knowing about the query.

The first computing device 102 further has at least one user interface to present the movement information and messages to the first user 104. In some embodiments, the user interface may include a graphics card for displaying data to the first user 104 and receiving data from the first user 104. The user interface may also include computer-executable instructions (e.g., a driver) for operating the graphics card. Further, the user interface may include a display (e.g. a touch screen display or natural user interface) and/or computer-executable instructions (e.g., a driver) for operating the display. The user interface may also include one or more of the following to provide data to the first user 104 or receive data from the first user 104: speakers, a sound card, a camera, a microphone, a vibration motor, one or more accelerometers, a BLUETOOTH brand communication module, global positioning system (GPS) hardware, and a photoreceptive light sensor. For example, the first user 104 may input commands or manipulate data by moving the first computing device 102 in a particular way.

Figure 2:
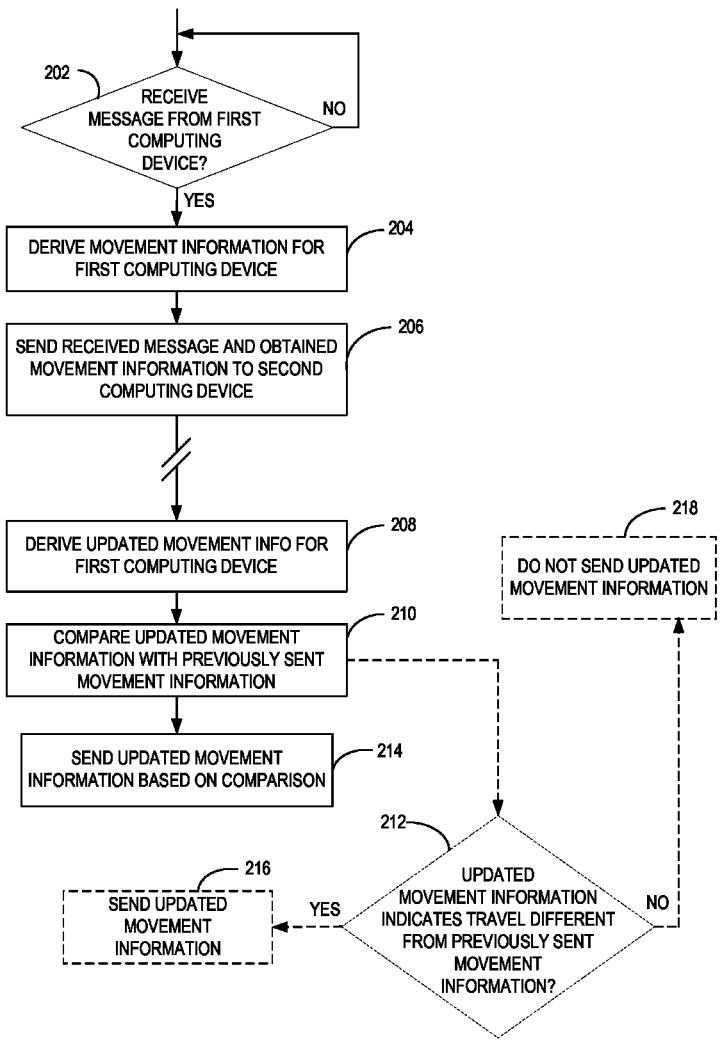
FIG. 2 is an exemplary flow chart illustrating operation of the first computing device sending a message and movement information to the second computing device.

Referring next to FIG. 2, an exemplary flow chart illustrates operation of the first computing device 102 to send a message and movement information to the second computing device 124. At 202, the first computing device 102 checks whether a message intended for the second computing device 124 has been received from the first user 104. For example, the first user 104 may be typing the message into the first computing device 102. When the message is received, the first computing device 102 at 204 derives movement information describing travel of the first computing device 102 from the sensors 112 and/or other means, such as using a cellular telephone network, a Wi-Fi-based system, and/or a mapping application. The movement information includes, for example, travel information such as the route being used by the first user 104 of the first computing device 102 and the estimated time of arrival (ETA). The movement information may further include a heading, velocity information, and/or projected trajectory of the first computing device 102 along a route, as well as the current location of the first computing device 102. The current location may be represented with latitude, longitude, elevation, a rate of climb, and/or descent.

In some embodiments, the movement information is derived from data (e.g., position data) obtained from the sensors 112, mapping information, traffic information, and the like. For example, a mapping application may post-process position data from the sensors 112 in conjunction with the mapping information and/or traffic information to produce the movement information.

At 206, the received message and the derived movement information are sent to the second computing device 124 by the first computing device 102. Based on the user identifiers 118 and the permissions 120 for the second user 122, the first computing device 102 may send the message and movement information to the second computing device 124 automatically, or otherwise without explicit or contemporaneous input from the first user 104. In other embodiments, the first user 104 is prompted to authorize sending the movement information with the message.

In some embodiments, the message and the movement information are sent to the second computing device 124 in the same message and/or displayed by the same application at the second computing device 124. In other embodiments, the message and the movement information are sent to the second computing device 124 in different messages. The second computing device 124 displays the message and movement information to the second user 122.

Subsequently, or otherwise at some point in time after sending the message and movement information to the second computing device 124, the first computing device 102 derives updated movement information from the sensors 112 at 208. In some embodiments, the first computing device 102 derives the updated movement information in response to an elapsed time, triggers, events, criteria, rules, and/or other factors. For example, the first computing device 102 may derive the updated movement information after a pre-defined period of time has elapsed, upon detecting a change in traffic conditions (e.g., congestion), upon detecting a change in travel (e.g., route) of the first computing device 102, and/or other factors.

At 210, the first computing device 102 compares the updated movement information with the previously sent movement information. Based on the comparison, the updated movement information is sent to the second computing device 124 by the first computing device 102 at 214. For example, the first computing device 102 may check at 212 whether the updated movement information indicates travel that is different from the travel that was indicated by the previously sent movement information. If the updated movement information indicates travel that is different from the travel that was indicated by the previously sent information, the updated movement information is sent to the second computing device 124 at 216. For example, the updated movement information may indicate that the first computing device 102 is now on a route that is different from the earlier route. As another example, the updated movement information may be sent when a current ETA is different from the earlier ETA (e.g., by a pre-defined threshold duration or amount of time)

If the updated movement information does not differ significantly (e.g., by a pre-defined threshold) from the previously sent movement information, the first computing device 102 does not send the updated movement information at 218 to the second computing device 124. For example, if the updated movement information is approximately or substantially the same as the previously sent movement information, the updated movement information is not sent to the second computing device 124.

Alternatively or in addition, the updated movement information is derived and sent in accordance with an update frequency stored in the memory area 108. The update frequency may be defined by the first user 104, by an operating system of the first computing device 102, and/or another entity.

Figure 3:
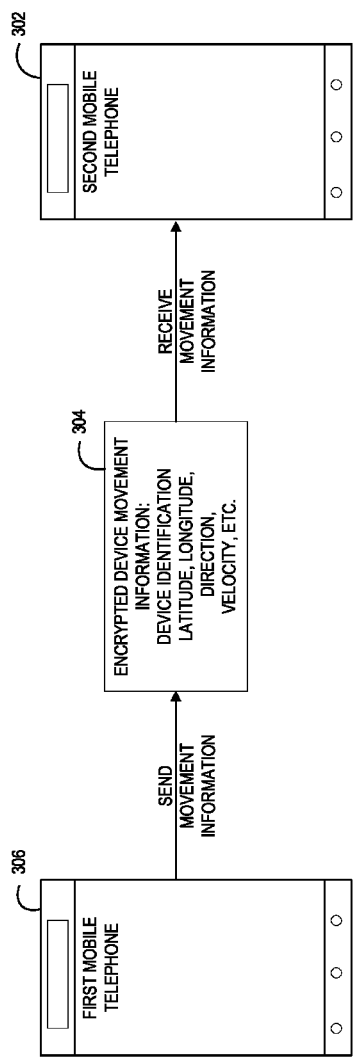
FIG. 3 is an exemplary block diagram illustrating a first mobile telephone sending movement information to a second mobile telephone.

Referring next to FIG. 3, an exemplary block diagram illustrates an embodiment in which a first mobile telephone 306 sends movement information to a second mobile telephone 302. The first computing device 102, for example, the first mobile telephone 306, is in communication with the second computing device 124, for example, the second mobile telephone 302, via any network (e.g., network 128). In this example, the user of the first mobile telephone 306 has given permission to share the movement information with the second mobile telephone 302. For example, the permissions 120 have been defined to allow such sharing.

The first mobile telephone 306 may be configured to intermittently, at pre-determined times, and/or upon the occurrence of another pre-defined event, send its movement information to the second mobile telephone 302 without any action by the user of the first mobile telephone 306. The movement information is sent in encrypted form 304 that includes the device identification, the current latitude, longitude, direction, velocity, route, estimated time of arrival at a destination, etc.

The second mobile telephone 302 may be configured to receive movement information of the first mobile telephone 306 without prompting the user of the second mobile telephone 302 to accept or reject the movement information. Rather, in some embodiments, the second mobile telephone 302 receives the movement information and displays the movement information along with the associated message. For example, the location may be displayed as text, displayed in a map application executed by the second mobile telephone 302, and/or displayed in a tile or other user interface element on a home screen of the second mobile telephone 302.

Figure 4:
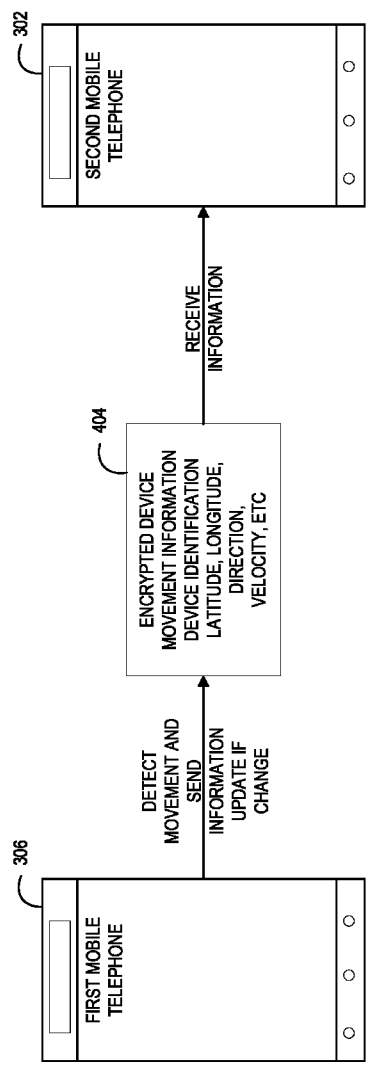
FIG. 4 is an exemplary block diagram illustrating the first mobile telephone detecting its movement and sending the movement information to the second mobile telephone.

Referring next to FIG. 4, an exemplary block diagram illustrates the first mobile telephone 306 detecting its movement and sending updated movement information to the second mobile telephone 302. The first mobile telephone 306 detects its movements using sensors, such as the sensors 112 or by other means, based on the triggers, events, criteria, etc., such as described with reference to FIG. 2. Without a request from the second mobile telephone 302, the first mobile telephone 306 derives and sends the updated movement information in encrypted form 404 to the second mobile telephone 302. The updated movement information includes, for example, device identification, current latitude, longitude, direction, velocity, etc. The second mobile telephone 302 receives the updated movement information and notifies the user of the second mobile telephone 302 of the updated movement information (e.g., as text, in the map application, etc.).

Figure 5:
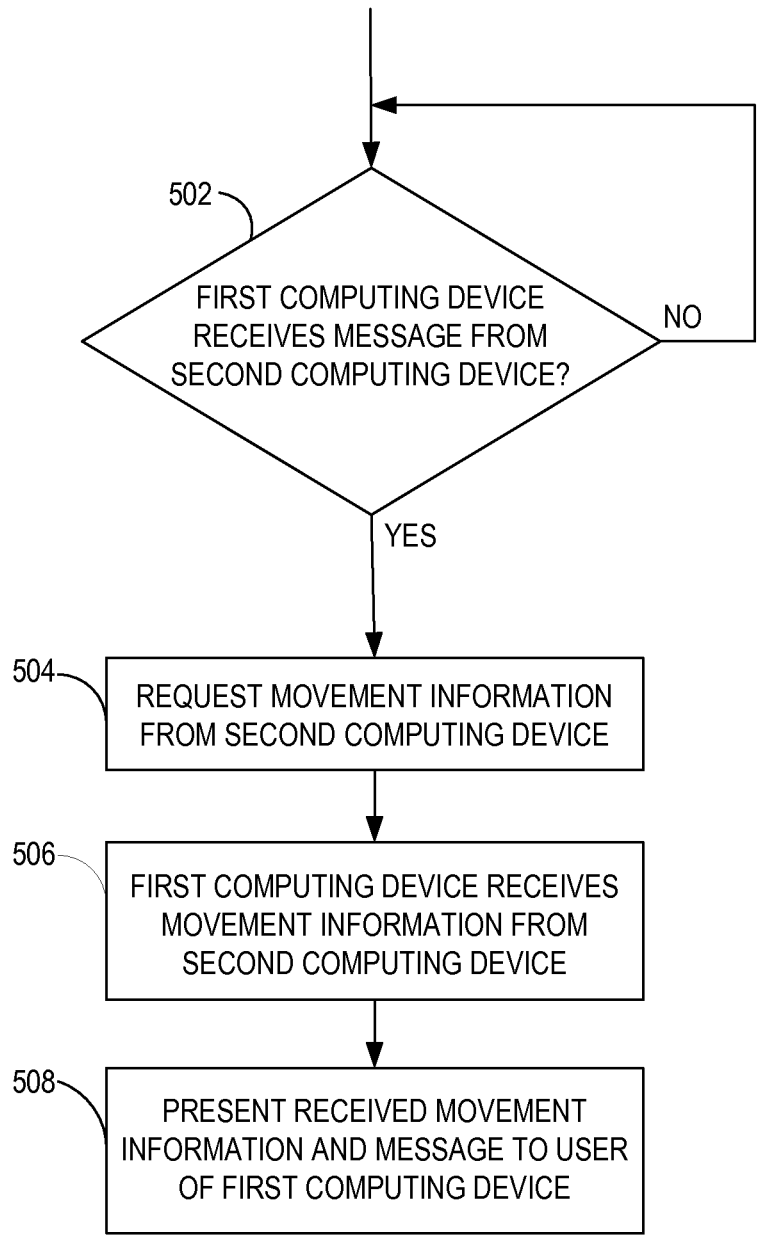
FIG. 5 is an exemplary flow chart illustrating operation of the first computing device to receive and present movement information from the second computing device.

Referring next to FIG. 5, an exemplary flow chart illustrates operation of the first computing device 102 to receive and present movement information from the second computing device 124. In the example of FIG. 5, the second computing device 124 may be configured to send the movement information only on request. For example, the second user 122 may be trying to reduce power consumption on the second computing device 124, or reduce the quantity or size of transmitted messages to stay within a data plan limit for messages.

At 502, the first computing device 102 checks whether a message has been received from the second computing device 124. When a message is received from the second computing device 124, the first computing device 102 determines whether movement information has been included with the message. If the movement information is not available, and if the user identifiers 118 and permissions 120 indicate that movement information is authorized to be received, the first computing device 102 sends a request to the second computing device 124 at 504 for the movement information associated with the second computing device 124.

For example, the identification of the user sending the message is compared with the user identifiers 118 stored by the user receiving the message. The request for the movement information is sent to the second computing device 124 based on the comparison. For example, if the comparison reveals that the user sending the message is within a group of close relatives or friends (e.g., an allowed user), the first computing device 102 sends the request for the movement information. In contrast, if the comparison reveals that the user sending the message is not within a group of close relatives or friends (e.g., a blocked user), the first computing device 102 does not send the request for the movement information.

Alternatively or in addition, the second computing device 124 uses the permissions 120 stored by the second computing device 124 to determine whether to send the movement information in response to the request from the first computing device 102. In this manner, the second computing device 124 authorizes or rejects the sharing of the movement information with the first computing device 102.

In some embodiments, operations 504 and 506 are performed without explicitly informing the first user 104 (e.g., without user action or authorization at the time of receiving the message from the second computing device 124). In some other embodiments, the request may be sent based on an input by the first user 104.

At 506, the first computing device 102 receives the movement information from the second computing device 124. At 508, the received message and the movement information are presented to the first user 104. In some embodiments, a single application from the applications 110 executes to display both the received message and the movement information in a user interface.

The operations illustrated in FIG. 5 may also be described from the perspective of the second computing device 124. In particular, the second computing device 124 sends a message to the first computing device 102 (e.g., a text message) over a peer-to-peer connection without sending movement information. Subsequently, the second computing device 124 receives a request for the movement information from the first computing device 102. The second computing device 124 analyzes the request in view of the permissions 120 to determine whether to send the movement information to the first computing device 102. Based on the determination, the second computing device 124 derives the movement information (e.g., from data from the sensors 112) and transmits the movement information to the first computing device 102 (e.g., in a text message) over the peer-to-peer connection.

An example of the operations shown in FIG. 5 is next described.

Figure 6:
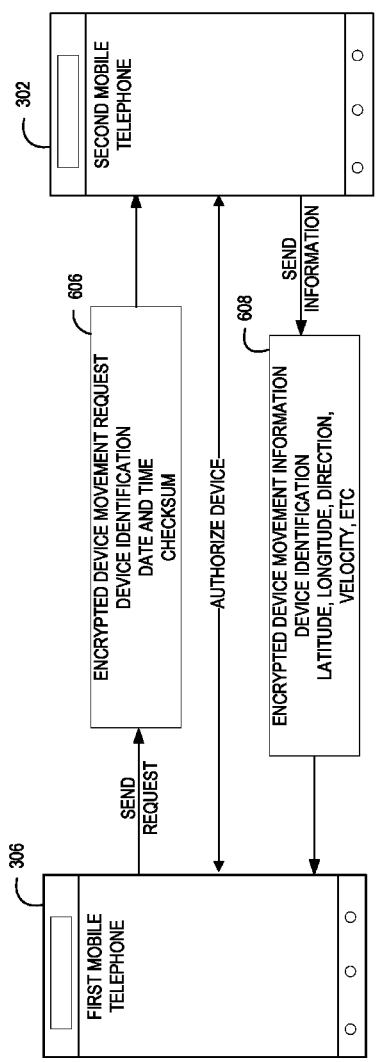
FIG. 6 is an exemplary block diagram illustrating the first mobile telephone requesting and receiving movement information from the second mobile telephone.

Referring next to FIG. 6, an exemplary block diagram illustrates an embodiment in which the first mobile telephone 306 requests movement information from the second mobile telephone 302. The first mobile telephone 306 and the second mobile telephone 302 may initially communicate to authorize the first mobile telephone 306 to request and obtain movement information from the second mobile telephone 302. Alternatively, the authorization may occur in response to receiving a request for the movement information, such as illustrated in FIG. 6.

While FIG. 6 illustrates the first mobile telephone 306 requesting and receiving the movement information from the second mobile telephone 302, the roles of the first mobile telephone 306 and the second mobile telephone 302 may be reversed, such that the second mobile telephone 302 requests and receives the movement information from the first mobile telephone 306.

As shown in FIG. 6, the first mobile telephone 306 sends a request 606 to the second mobile telephone 302 for the movement information associated with the second mobile telephone 302. For example, the first mobile telephone 306 requests the movement information in response to receiving a message from the second mobile telephone 302. In some embodiments, the request 606 is encrypted and includes device identification for the first mobile telephone 306 (e.g., a device identifier), a date and time of the request 606 (or a date and time of the message received from the second mobile telephone 302), and a checksum.

The second mobile telephone 302 receives the request 606, evaluates the request 606, and responds to the request 606. For example, the second mobile telephone 302 may authenticate and/or validate the request 606 by comparing information from the request 606 with information stored by, or accessible to, the second mobile telephone 302. In response, the second mobile telephone 302 sends the requested movement information 608 to the first mobile telephone 306. The requested movement information 608 includes, for example, a device identifier associated with the second mobile telephone 302, current route, current latitude, longitude, direction, velocity, and/or other information describing the second mobile telephone 302 (e.g., travel information for the second mobile telephone 302). Further, the requested movement information 608 may be encrypted.

Additional Examples

In one scenario, the movement information may be automatically collected and sent to the second user 122 when the first user 104 leaves a work environment. In another scenario, the movement information may be automatically collected and sent to the second user 122 when the first computing device 102 is reported as stolen. In these scenarios, the movement information may be sent without a message from the first user 104, or with a default message.

Some embodiments contemplate implementation of both a pull scenario and a push scenario, such as in different threads if the first computing device 102 supports multiple threads. For example, the first computing device 102 may check whether a first message, intended for the second user 122, has been received from the first user 104 (e.g., the first user 104 has typed a message) and whether a second message, intended for the first user 104, has been received from the second computing device 124, both via a peer-to-peer connection.

In response to receiving the first message, the first computing device 102 derives first movement information from the sensors 112 or by other means as described herein, and sends the first message with the first movement information to the second computing device 124. In response to receiving the second message, the first computing device 102 obtains second movement information from the second computing device 124 (e.g., by sending a request for the second movement information to the second computing device 124) and, upon receipt of the second movement information, presents the second message and the second movement information to the first user 104.

Some aspects of the disclosure operate independently of the type or brand of operating system executing on the first computing device 102 and the second computing device 124. In such embodiments, each of the first computing device 102 and the second computing device 124 execute client applications enabling peer-to-peer communication. Further, aspects of the disclosure are backwards compatible. For example, if the second computing device 124 is not capable of displaying or otherwise using the movement information receiving from the first computing device 102, the second computing device 124 will at least display the message to the second user 122 and disregard the movement information.

Some embodiments contemplate filtering the movement information, before sending the movement information, based on the location of the sending device and/or the recipient at the device receiving the movement information. For example if the user at the sending device is walking or jogging, the velocity and/or direction information may not be sent to the recipient. In contrast, some embodiments contemplate adding metadata to the message and/or movement information. For example, some embodiments contemplate adding tags indicating an urgency and/or importance of the message. The urgency and/or importance of the message may be derived from the message itself and/or from the movement information.

In some embodiments, the ETA may be refined based on the day of the week and the time, wherein previous traffic data corresponding to the day of the week and the time is stored in the memory area 108 is used to refine the ETA.

In some embodiments, the first computing device 102 and the second computing device 124 may be in a peer-to-peer communication with each other using a Wi-Fi Direct communication methodology with a Wi-Fi Protected Setup. Initial pairing of the computing devices may be done using near-field communication (NFC) in such cases.

In some embodiments, at least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUE-TOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from the users such as location or movement data, and the sharing of the monitored or collected data with other users. Notice may be provided to the users of the collection and sharing of the data (e.g., via a dialog box or preference setting) and users are given the opportunity to give or deny consent for the monitoring, collection, and/or sharing and/or to customize what data is monitored or collected and/or with whom the data is shared. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile memories, removable and non-removable memories implemented in any method or technology for storage of information such as computer readable instructions, data structures, program modules and other data. Computer storage media are tangible and mutually exclusive to communication media. Computer storage media exclude propagated data signals. In some embodiments, computer storage media are implemented in hardware. Exemplary computer storage media include hard disks, flash drives, and other solid-state memories. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Less mobile or stationary computing systems described herein may at least be used to receive the messages and the movement information. Such systems or devices may accept input from the user in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for peer-to-peer communication of movement information, said system comprising: one or more sensors associated with a first computing device providing movement information describing travel of the first computing device; and a processor associated with the first computing device programmed to: receive a message from a first user of the first computing device, the message being intended for a second user at a second computing device; in response to receipt of the message by the first computing device, derive the movement information from the one or more sensors associated with the first computing device; filter, by the first computing device, the derived movement information based on location of the second computing device, content of the derived movement information, and a context in which the movement information was derived; the filtered derived movement information comprising a part of the derived movement information, wherein determining of the part is based on permissions defined dynamically based on an evaluation of the received message; send the received message and the filtered derived movement information to the second computing device via a peer-to-peer connection; subsequently derive updated movement information for the first computing device from the one or more sensors; compare the derived, updated movement information with the sent movement information; and send the derived, updated movement information to the second computing device based on the comparison.

2. The system of claim 1, wherein the one or more sensors comprise at least one of an accelerometer, a gyroscope, a global positioning system (GPS) receiver, or a wireless network transceiver.

3. The system of claim 1, wherein the movement information comprises at least one of a route or a velocity.

4. The system of claim 1, wherein the processor is programmed to send the derived, updated movement information to the second computing device on determining that the derived, updated movement information indicates travel differing from travel indicated by the sent movement information.

5. The system of claim 1, wherein the processor is programmed to subsequently derive the updated movement information based on an update frequency stored in a memory area.

6. The system of claim 1, wherein the movement information comprises a first estimated time of arrival, wherein the updated movement information comprises a second estimated time of arrival, and wherein the processor is programmed to send the derived, updated movement information to the second computing device on determining that the second estimated time of arrival differs from the first estimated time of arrival by a pre-defined threshold amount.

7. The system of claim 1, wherein the processor is programmed to send the received message and the filtered derived movement information to the second computing device in a same message or in a different message.

8. The system of claim 1, further comprising a memory area storing a set of user identifiers and permissions associated therewith, wherein the processor is programmed to derive the movement information and send the received message and the derived movement information to the second computing device based on the permissions corresponding to the second user.

9. A method of peer-to-peer communication comprising: receiving, by a first computing device, a message from a second computing device; in response to receipt of the message, requesting, by the first computing device, movement information from the second computing device describing travel of the second computing device; receiving, by the first computing device, filtered derived movement information from the second computing device via a peer-to-peer connection, wherein the filtered derived movement information is generated by deriving movement information from one or more sensors associated with the second computing device and filtering the derived movement information based on location of the first computing device, content of the derived movement information, and a context in which the movement information was derived, the filtered derived movement information comprising a part of the derived movement information, wherein determining the part of the derived movement information is based on permissions defined dynamically based on an evaluation of the request; and presenting the received message and the received filtered derived movement information to a user of the first computing device.

10. The method of claim 9, wherein presenting the received message and the received filtered derived movement information to the user comprises displaying the received message and the received filtered derived movement information in a single application executing on the first computing device.

11. The method of claim 9, wherein presenting the received message and the received filtered derived movement information to the user comprises displaying the received message and the received filtered derived movement information in a single user interface element displayed on the first computing device.

12. The method of claim 9, wherein requesting movement information from the second computing device occurs without input from the first user.

13. The method of claim 9, wherein the received message is from an originating user, further comprising comparing the originating user to a set of users associated with the user of the first computing device, and wherein requesting the movement information occurs based on the comparison.

14. The method of claim 13, wherein requesting the movement information is blocked on determining that the originating user is a blocked user based on the comparison.

15. The method of claim 13, wherein requesting the movement information is allowed on determining that the originating user is an allowed user based on the comparison.

16. The method of claim 13, further comprising automatically populating the set of users based on at least one of contacts, calendar entries, or previous messages, associated with the user of the first computing device.

17. One or more computer storage devices storing computer-executable instructions that, upon execution, cause at least one processor to share movement information by: receiving a first message from a first user of a first computing device and a second message from a second user of a second computing device, the first message being intended for the second user, the second message being intended for the first user; in response to receipt of the first message, deriving first movement information from one or more sensors of the first computing device and filtering the derived first movement information based on location of the second computing device, content of the derived movement information, and a context in which the movement information was derived, the filtered derived movement information comprising a part of the derived movement information, wherein determining the part of the derived movement information is based on permissions defined dynamically based on an evaluation of the received first message, the first movement information describing travel of the first computing device; in response to receipt of the second message, obtaining second movement information from the second computing device, the second movement information describing travel of the second computing device; sending the received first message and the filtered derived first movement information to the second computing device via a peer-to-peer connection; and presenting the received first message and the filtered derived first movement information to the second user.

18. The computer storage devices of claim 17, wherein the computer-executable instructions cause the processor to derive the first movement information and send the received first message and the filtered derived first movement information to the second computing device based on at least one of a location of the first computing device, time of day, battery life of the first computing device, or a category of the received first message.

19. The computer storage devices of claim 17, wherein the computer-executable instructions cause the processor to derive the first movement information and send the received first message and the filtered derived first movement information to the second computing device without input from the first user.

20. The computer storage devices of claim 17, wherein the first movement information comprises a current location of the first computing device.

* * * * *